United States Patent [19]
Waddington

[11] 3,735,448
[45] May 29, 1973

[54] WIRE TIE

[75] Inventor: William T. Waddington, Fanwood, N.J.

[73] Assignee: Buchanan Electrical Products Corporation, Union, N.J.

[22] Filed: Feb. 25, 1970

[21] Appl. No.: 14,023

[52] U.S. Cl. .............................................. 24/16 PB
[51] Int. Cl. ............................................. B65d 63/00
[58] Field of Search .................... 24/16 PB, 30.5 PB, 24/17, 208.1, 208.3, 206.1, 73.7, 20 TT, 73.7 SA, 73.7 PB; 248/74, 74 PB; 292/307, 322

[56] References Cited

UNITED STATES PATENTS

| 3,605,199 | 9/1971 | Eberhardt | 24/16 PB |
| 3,214,808 | 11/1965 | Litwin | 24/16 PB |
| 3,368,247 | 2/1968 | Orban | 24/16 PB |
| 3,486,200 | 12/1969 | Orenick | 24/16 PB |
| 3,486,201 | 12/1969 | Bourne | 24/16 PB |

FOREIGN PATENTS OR APPLICATIONS 1,573,303  7/1969  France .............................. 24/16 PB Primary Examiner—Donald A. Griffin
Attorney—Samuelson and Jacob

[57] ABSTRACT

A unitary wire tie of the type in which spaced ratchet teeth are provided along the length of a strap portion for engagement with a pawl in a head portion to retain the wire tie in a looped configuration, the pawl being provided with at least a pair of teeth spaced apart slightly less than the spacing between adjacent ratchet teeth.

13 Claims, 4 Drawing Figures

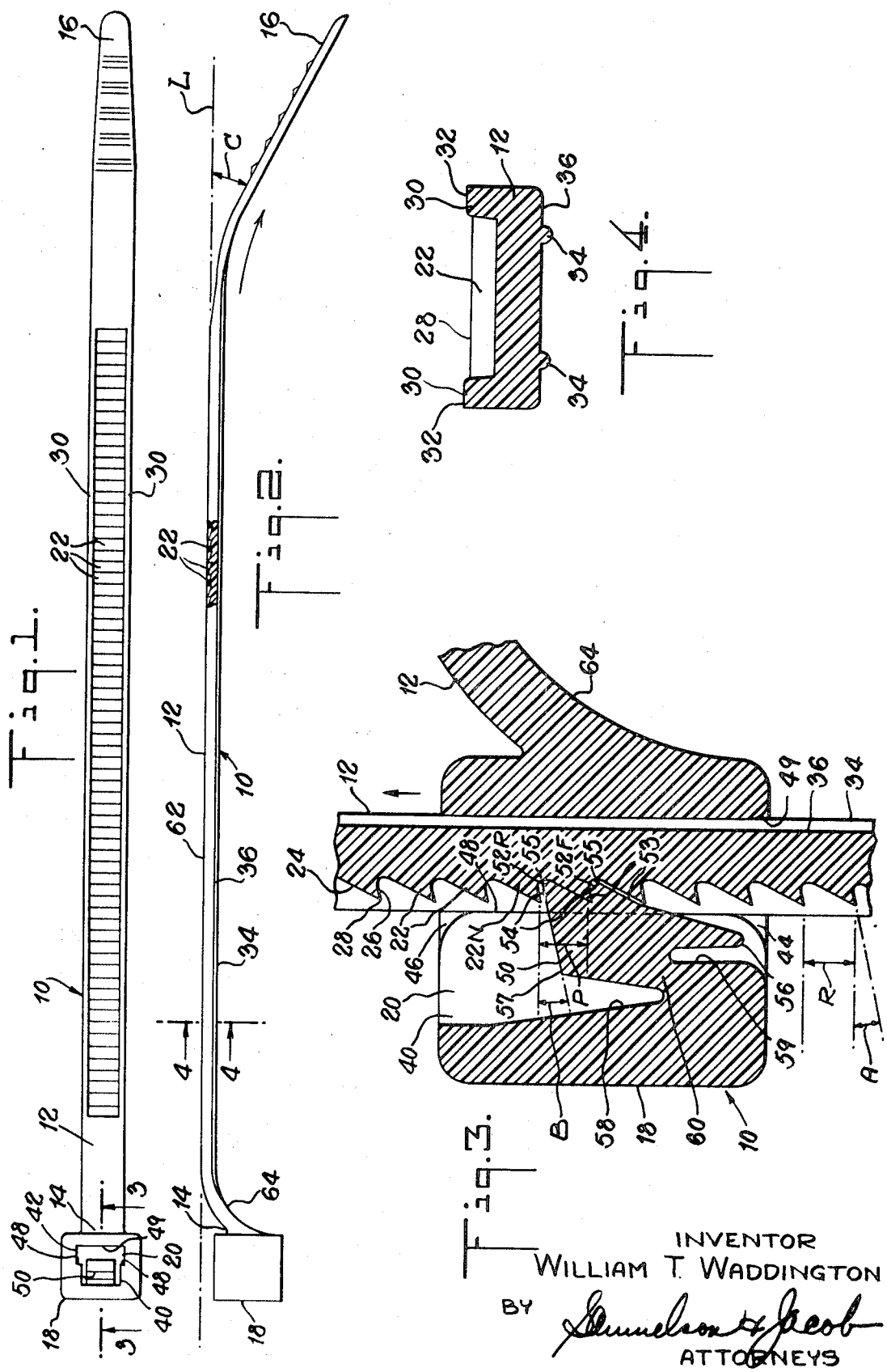

WIRE TIE

The present invention relates generally to devices for bundling a plurality of wires, cables, cords or the like and pertains, more specifically, to wire ties.

Wire ties have found wide commercial acceptance and have been made available in various sizes and configurations for the purpose of binding together parallel wires in the electrical wiring of a wide variety of electrical equipment as well as in the wiring of commercial, industrial and residential buildings. Among the most popular of these wire ties are those constructed in the form of a strap carrying a plurality of ratchet teeth and an aperture head integral with one end of the strap. In using the device, the other end of the strap is inserted into the apertured head to form a loop and the loop is drawn tight around a bundle of wires by advancing the strap through the head. A pawl is provided in the head for engaging the ratchet teeth to retain the strap in the looped configuration and maintain the wires in a tight bundle. These devices have been fabricated in unitary molded structures of resilient plastics, such as nylon, in an effort to render the devices inexpensive as well as dependable in use.

Among the more important characteristics of such devices is the ability to retain the strap within the head in order to maintain a tight loop and a concomitant tight bundle. A number of head and strap configurations including a variety of pawl and ratchet mechanisms have been proposed in an effort to meet such requirements; however, the most readily manufactured configurations have lacked dependability in operation while the most effective configurations have been more difficult and more expensive to fabricate.

It is therefore an important object of the invention to provide a wire tie which is dependable in operation and which can be fabricated relatively easily and inexpensively in large quantities.

Another object of the invention is to provide a unitary wire tie which may be drawn into a tight loop about a bundle of wires and will be firmly and positively retained in that tight loop.

A further object of the invention is to provide a wire tie which is easier to use by virtue of structural features which indicate to the operator the proper orientation of the device in making a loop and which facilitate the making of the loop.

The above objects, as well as still further objects and advantages, are attained by the invention which may be described briefly as a unitary wire tie of flexible material for being looped about a plurality of wires and retained in such looped configuration to hold the wires in a bundle, the wire tie comprising an elongate strap portion including a plurality of ratchet teeth spaced from one another along at least a portion of the length of the strap portion, each ratchet tooth having an inclined leading face, an apex, and a trailing face inclined slightly from the apex toward the leading face, a head portion adjacent one end of the strap portion and including an aperture through which the strap portion may be advanced in a longitudinal direction from an entrance toward an exit of the aperture, at least one pair of pawl teeth extending laterally into the aperture, each pawl tool having an inclined leading face, an apex, and a trailing face inclined slightly from the apex toward the leading face, the teeth of the pair of pawl teeth being spaced longitudinally from one another, the pawl teeth being located for engaging the ratchet teeth of the strap portion when the strap portion is advanced through the aperture, and the spacing between the pair of pawl teeth being slightly less than the spacing between adjacent ratchet teeth such that one of the ratchet teeth will be seated between the pair of pawl teeth to retain the strap portion against withdrawal from the head portion.

The invention will be more fully understood while even further objects and advantages will become apparent in the following detailed description of an embodiment of the invention illustrated in the accompanying drawing, in which:

FIG. 1 is a plan view of a wire tie constructed in accordance with the invention;

FIG. 2 is an elevational view of the wire tie;

FIG. 3 is an enlarged fragmentary cross-sectional view taken along line 3—3 of FIG. 1; and FIG. 4 is an enlarged cross-sectional view taken along line 4—4 of FIG. 2.

Referring now to the drawing, and especially to FIGS. 1 and 2 thereof, a wire tie constructed in accordance with the invention is illustrated generally at 10 and is shown to have an elongate strap portion 12 extending from one end 14 to an opposite end 16. A head portion 18 is integral with the strap portion at end 14 thereof and includes an aperture 20 passing longitudinally through the head portion.

As best seen in FIGS. 3 and 4, as well as in FIG. 1, the elongate strap portion 12 carries a plurality of ratchet teeth 22 spaced from one another along a part of the length of the strap portion. Each ratchet tooth 22 is provided with a profile which includes an inclined leading face 24 and a trailing face 26 intersecting at an apex 28. The trailing face 26 is also inclined slightly from the apex 28 toward the leading face 24; that is, rather than being normal to the direction in which the strap portion 12 extends, the trailing face 26 makes a slight angle A (see FIG. 3) with the normal, angle A preferably being of the order of magnitude of 10°. All of the ratchet teeth 22 extend across the strap portion between a pair of side rails 30 with the apexes 28 of the ratchet teeth 22 being recessed slightly below the uppermost surfaces 32 of the side rails 30. A pair of bead-like runners 34 project downwardly from the lower surface 36 of the strap portion 12 and extend along the strap portion for at least the same length as the part which carries the ratchet teeth.

As best seen in FIGS. 1 and 3, the aperture 20 has a T-shaped configuration which includes a lateral portion 40 corresponding to the vertical element of the T and a transverse portion 42 corresponding to the horizontal top of the T. The opening provided by the transverse portion 42 of the aperture 20 corresponds to the generally rectangular cross-sectional configuration of the strap portion 12 (as seen in FIG. 4). Thus, in making a loop, the end 16 of the strap portion may be grasped and brought around, in the direction of the arrow in FIG. 2, inserted within the entrance 44 of the aperture 20 and advanced toward the exit 46 of the aperture. The end 16 is somewhat thinner and narrower than the part of the strap portion 12 which carries the ratchet teeth so that the end 16 may be threaded easily into the transverse portion 42 of the aperture 20 and advanced through the head portion 18. Further advancement of the strap portion through the head portion will bring the uppermost surfaces 32 of the side rails 30 into sliding contact with the lower surfaces 48 of the transverse portion 42 while the runners 34 will come into sliding contact with the upper surface 49 of a transverse portion of aperture 20. By thus limiting the area of contact between the strap portion 12 and the aperture 20 to contact of the guide rails 30 and the runners 34 and the corresponding portions of the aperture 20, friction between the strap portion and the head portion is reduced and advancement of the strap portion through the head portion is facilitated while strap portion 12 is positively located within and guided through aperture 20 by lower and upper surfaces 48 and 49.

In using the wire tie 10, the wires to be bundled (not shown) are placed adjacent the lowermost surface 36 of the strap portion 12 so that the wires will be within the loop formed by the above described insertion of the end 16 into the head portion 18. As the strap portion is advanced through the head portion and the loop is tightened around the bundle of wires it becomes important to restrain the strap portion against retraction from the head portion so as to retain the tight loop around the bundle of wires. In order to retain the strap portion 12 in an advanced position within the head portion 18, a pawl is provided in the form of a tongue 50 projecting laterally into the aperture 20, generally coextensive with the lateral portion 40 thereof. The tongue 50 carries a pair of pawl teeth 52F and 52R which extend laterally into the transverse portion 42 of the aperture 20 to intercept the ratchet teeth 22 carried by the strap portion 12 as the strap portion is advanced through the aperture. Each pawl tooth 52F and 52R has a profile which includes an inclined leading face 53 and a trailing face 54 intersecting the leading face at an apex 55. The trailing face 54 is also inclined slightly from the apex 55 toward the leading face 53; that is, rather than being normal to the direction in which the aperture 20 extends, the trailing face 54 makes a slight angle B (see FIG. 3) with the normal, angle B preferably being of the order of magnitude of 13°.

The tongue includes a forward end 56 adjacent the entrance 44 of the aperture and a rearward end 57 adjacent the exit 46 of the aperture 20. A first groove 58 extends into the tongue from the rearward end 57 toward the forward end 56 and a second groove 59 extends into the tongue from the forward end 56 toward the rearward end 57 of the tongue such that the two grooves 58 and 59 establish a relatively thin neck 60 between the pawl teeth 52F and 52R and the head portion 18 such that the tongue 50 may flex to permit forward and rearward rocking motion of the pawl teeth.

The neck 60 is located with respect to the pawl teeth 52F and 52R such that the pawl teeth may be rocked about an axis located forward of the pawl teeth. Thus, advancement of the strap portion 12 through the aperture 20 of the head portion 18 in the direction of the arrow in FIG. 3 will enable the inclined leading faces 24 of the ratchet teeth 22 to resiliently deflect the pawl teeth 52F and 52R out of engagement with the ratchet teeth 22 to permit continued advancement of the strap portion 12 through the head portion 18, such resilient deflection being permitted by virtue of the flexible nature of the neck 60 and the location of the groove 58. However, upon attempted retraction of the strap portion 12 from the head portion 18 (in a direction opposite to the arrow in FIG. 3) a ratchet tooth 22 will become seated between the forward pawl tooth 52F and the rearward pawl tooth 52R. Because the tongue 50 will rock about an axis located forward of the pawl teeth, such attempted retraction of the strap portion 12 will cause the trailing face 26 of the ratchet tooth 22 to bear against the corresponding trailing face 54 of forward pawl tooth 52F. Further retraction will cause rearward pawl tooth 52R to come into engagement with the next ratchet tooth 22N. The distance P between the apexes of the pawl teeth 52F and 52R is slightly less than the distance R between the apexes 28 of the ratchet teeth 22 so that when the rearward pawl tooth 52R swings to come into engagement with the next ratchet tooth 22N, the pawl tooth 52R will be far enough forward of ratchet tooth 22N to swing clear of the apex of the ratchet tooth 22N so that the pawl tooth 52R will not interfere with the apex of ratchet tooth 22N and both the ratchet tooth 22 between the pawl teeth 52F and 52R and the ratchet tooth 22N can fully engage a corresponding pawl tooth.

When an initial retractive force is applied to the strap portion 12, only the forward pawl tooth 52F will bear the load imposed by such force. As seen in FIG. 3, a gap may actually exist between the trailing face 26 of the next ratchet tooth 22N and the corresponding trailing face 54 of the rearward pawl tooth 52R. However, as the retractive force is increased and additional retractive loading is applied, both the forward pawl tooth 52F and the abutting ratchet tooth 22 may be resiliently deformed until that gap is closed, bringing the next ratchet tooth 22N against the rearward pawl tooth 52 R so that the rearward pawl tooth wil begin to bear a portion of the load.

In this manner, a ratchet tooth 22 can become fully seated between the pair of pawl teeth 52F and 52R and the next ratchet tooth 22N can effectively engage the rearward pawl tooth 52R, the inclination of the trailing faces of the engaged ratchet and pawl teeth assuring intimate contact between engaged trailing faces as the tongue 50 is rocked about its axis in response to a retractive force on the strap portion 12. Since the inclination of the trailing faces 26 and 54 of the ratchet and pawl teeth, respectively, is in the forward direction, retractive forces will tend to engage rather than disengage, the cooperating ratchet and pawl teeth. Such complete cooperation between the engaged ratchet and pawl teeth has been found to enhance the operation of the above described pawl and ratchet mechanism so as to increase the retention of the strap portion within the head portion and hence increase the dependabilty of the wire tie.

It has been found that where the spacing P between the pawl teeth 52F and 52R is approximately 10 percent less than the spacing R between the ratchet teeth 22, optimum results have been obtained. Adequate performance has been observed where the spacing P between the pawl teeth is approximately 2 percent to 20 percent less than the spacing R between adjacent ratchet teeth.

Where excessive retractive force is applied to the strap portion 12, rocking of the tongue 50 in the direction toward the entrance 44 of the aperture 20 is limited by engagement of the forward end 56 of the tongue with the wall of the aperture so as to positively preclude retraction of the strap portion 12 from the head portion 18.

Returning now to FIG. 2, it is noted that the major part of the strap portion 12 normally extends in a straight line and therefore may be said to lie in a plane whose trace is shown at L. However, the end 16 departs from that straight line and makes an acute angle C with plane L in the direction in which the wire tie is to be looped. The provision of angle C assures that the end 16 is always fully exposed for gripping by an operator even when the uppermost surface 62 of the strap portion 12 is placed against a wiring board or panel when the wire tie is passed around the wires to be bundled. The provision of angle C also indicates to the operator the direction in which the strap portion is to be looped so that the end 16 will always be placed into the entrance 44 of the aperture 20. However, even if the end 16 were to be placed into the exit 46 of the aperture 20, rather than into the entrance 44 thereof, the strap portion would abut the end 57 of the tongue 50 and further insertion of the strap portion would be precluded.

Strap portion 12 is curved along portion 64 contiguous with the head portion 18. The radius of curvature of portion 64 is approximately the same as an average size bundle so as to facilitate the establishment of a loop in the wire tie and to indicate again the direction of such a loop. In addition, the curved portion 64 serves to space the head portion 18 out of plane L for ease of operation when the uppermost surface 62 of the strap portion 12 is flat against a circuit board or panel or the like.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. A unitary wire tie of flexible material for being looped about a plurality of wires and retained in such looped configuration to hold said wires in a bundle, said wire tie comprising:
   an elongate strap portion including a plurality of ratchet teeth spaced from one another along at least a part of the length of the strap portion, each ratchet tooth having an inclined leading face, an apex, and a trailing face inclined slightly from said apex toward said leading face;
   a head portion adjacent one end of the strap portion and including an aperture through which the strap portion may be advanced in a longitudinal direction from an entrance toward an exit of the aperture; and
   at least one pair of pawl teeth extending laterally into said aperture, each pawl tooth having an inclined leading face, an apex, and a trailing face inclined slightly from said apex toward said leading face, the teeth of said pair being spaced longitudinally from one another, said pawl teeth being located for engaging the ratchet teeth of the strap portion when the strap portion is advanced through said aperture;
   the spacing between the pawl teeth of said pair being slightly less than the spacing between adjacent ratchet teeth such that one of said ratchet teeth will be seated between said pair of pawl teeth to retain the strap portion against withdrawal from the head portion.

2. The wire tie of claim 1 wherein the spacing between the pawl teeth of said pair is approximately 2 percent to 20 percent less than the spacing between adjacent ratchet teeth.

3. The wire tie of claim 1 wherein the spacing between the pawl teeth of said pair is nominally 10 percent less than the spacing between adjacent ratchet teeth.

4. The wire tie of claim 1 wherein the inclination of the trailing face of the ratchet teeth is in the order of magnitude of 10° from the normal to said longitudinal direction and the inclination of the trailing face of the pawl teeth is in the order of magnitude of 13° from said normal.

5. The wire tie of claim 1 wherein the head portion includes:
   a tongue projecting laterally into the aperture, said pawl teeth being carried upon said tongue, said tongue including a forward end adjacent the entrance of the aperture and a rearward end adjacent the exit of the aperture;
   there being a first groove extending into said tongue from the rearward end toward the forward end thereof; and
   there being a second groove extending into said tongue from the forward end toward the rearward end thereof;
   said grooves establishing a relatively thin neck between the pawl teeth and the remainder of the head portion such that the tongue may flex through a forward and rearward rocking motion, said first groove allowing rocking of the tongue in response to advancement of the strap portion through the aperture sufficient to permit passage of the ratchet teeth over the pawl teeth and said second groove allowing limited rocking of the tongue in response to retraction of the strap portion to engage said one of the ratchet teeth between said pair of pawl teeth and preclude further retraction of the strap portion.

6. The wire tie of claim 5 wherein said neck is located axially between the entrance end of the aperture and the pair of pawl teeth such that the tongue may rock about an axis located forward of the pawl teeth.

7. The wire tie of claim 6 wherein the spacing between the pawl teeth of said pair is approximately 2 percent to 20 percent less than the spacing between adjacent ratchet teeth.

8. The wire tie of claim 6 wherein the spacing between the pawl teeth of said pair is nominally 10 percent less than the spacing between adjacent ratchet teeth.

9. The wire tie of claim 6 wherein the inclination of the trailing face of the ratchet teeth is in the order of magnitude of 10° from the normal to said longitudinal direction and the inclination of the trailing face of the pawl teeth is in the order of magntidue of 13° from said normal.

10. The wire tie of claim 6 wherein:
   said aperture has a T-shaped configuration including a lateral portion corresponding to the vertical element of the T and a transverse portion corresponding to the horizontal top of the T;
   said strap portion has a generally rectangular cross-sectional configuration corresponding to the transverse portion of the T-shaped configuration; and
   said tongue is generally coextensive with the lateral portion of the T-shaped configuration and the pawl teeth extend laterally into the transverse portion to intercept the ratchet teeth of the strap portion.

11. The wire tie of claim 1 wherein at least a part of the strap portion upon which the ratchet teeth are carried lies in a plane and the end of the strap portion opposite the end adjacent the head portion makes an acute angle with said plane in the direction of said looped configuration.

12. The wire tie of claim 1 wherein at least a part of the strap portion upon which the ratchet teeth are carried lies in a plane and a further part of the strap portion contiguous with the head portion is directed out of said plane in the direction of said looped configuration.

13. The wire tie of claim 12 wherein said further part is curved in the direction of said looped configuration, said curve having a radius of curvature approximating the radius of an average size bundle.

* * * * *